(12) United States Patent
Cha et al.

(10) Patent No.: US 12,496,874 B2
(45) Date of Patent: Dec. 16, 2025

(54) HEAT PUMP SYSTEM FOR VEHICLE

(71) Applicants: Hyundai Motor Company, Seoul (KR); Kia Corporation, Seoul (KR)

(72) Inventors: Yong Woong Cha, Yongin-si (KR); Wan Je Cho, Hwaseong-si (KR); Jungha Park, Gunpo-si (KR); Eon Soo Yun, Hwaseong-si (KR); ByeongGu Kang, Hwaseong-si (KR); Seongjae Lee, Suncheon-si (KR); Jong Il Park, Hwaseong-si (KR); Jai Young An, Suwon-si (KR); Seong-Bin Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 235 days.

(21) Appl. No.: 18/330,619

(22) Filed: Jun. 7, 2023

(65) Prior Publication Data

US 2024/0190211 A1  Jun. 13, 2024

(30) Foreign Application Priority Data

Dec. 12, 2022  (KR) .................. 10-2022-0172989

(51) Int. Cl.
*B60H 1/00* (2006.01)
*B60H 1/32* (2006.01)

(52) U.S. Cl.
CPC ....... *B60H 1/00899* (2013.01); *B60H 1/3213* (2013.01)

(58) Field of Classification Search
CPC .............. B60H 1/00899; B60H 1/3213; B60H 1/32281; B60H 1/00278; B60H 1/00885;
(Continued)

(56) References Cited

U.S. PATENT DOCUMENTS

| 2018/0117986 A1* | 5/2018 | Cho et al. .......... B60H 1/00278 |
| 2021/0061067 A1* | 3/2021 | Kim et al. ........... B60H 1/3213 |

(Continued)

FOREIGN PATENT DOCUMENTS

| CN | 110843465 A | | 2/2020 | |
| KR | 20210038120 A | * | 4/2021 | ............. B60H 1/143 |

OTHER PUBLICATIONS

KR 20210038120 A Translation (Year: 2021).*

*Primary Examiner* — Jerry-Daryl Fletcher
*Assistant Examiner* — Dario Antonio Deleon
(74) *Attorney, Agent, or Firm* — SLATER MATSIL, LLP (57) ABSTRACT

An embodiment heat pump system of a vehicle includes a valve controlling a flow of a coolant, a first line having ends connected to the valve, a radiator and an electrical component on the first line, a second line having ends connected to the valve, a battery module on the second line, a first connection line including a first end connected to the valve, a chiller on the first connection line, a second connection line including ends connected to the second and first connection lines, and a third connection line including a first end connected to a second end of the first connection line and a second end connected to the first line between the radiator and the electrical component, wherein the valve operates such that the first, second, or first connection line is connected to another line or to itself depending on the selected mode.

20 Claims, 5 Drawing Sheets

(58) Field of Classification Search
CPC ...... B60H 2001/00307; B60H 1/00385; B60H 1/00321; B60H 1/00392; B60H 1/004; B60H 1/00485; B60H 1/03; B60H 1/32; B60H 1/32284; B60H 1/143; B60H 1/3227; B60Y 2200/90
See application file for complete search history.

(56) References Cited

U.S. PATENT DOCUMENTS

| | | | |
|---|---|---|---|
| 2021/0379960 A1* | 12/2021 | Kim .................. | B60H 1/32284 |
| 2022/0410657 A1* | 12/2022 | Jin et al. ............ | B60H 1/32284 |
| 2023/0373271 A1* | 11/2023 | You et al. ........... | B60H 1/3229 |
| 2024/0190212 A1* | 6/2024 | Mukai et al. ...... | B60H 1/00885 |
| 2024/0246393 A1* | 7/2024 | Fabian et al. ...... | B60H 1/00885 |
| 2024/0278619 A1* | 8/2024 | Shibaoka et al. .. | B60H 1/00278 |
| 2024/0294053 A1* | 9/2024 | Tanabe et al. ..... | B60H 1/00899 |

* cited by examiner

HEAT PUMP SYSTEM FOR VEHICLE

CROSS-REFERENCE TO RELATED APPLICATIONS

This application claims the benefit of Korean Patent Application No. 10-2022-0172989, filed on Dec. 12, 2022, which application is hereby incorporated herein by reference.

TECHNICAL FIELD

The present disclosure relates to a heat pump system for a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode.

Meanwhile, recently, in accordance with a continuous increase in interest in energy efficiency and an environmental pollution problem, the development of an environmentally friendly vehicle capable of substantially substituting for an internal combustion engine vehicle is required, and the environmentally friendly vehicle is classified into an electric vehicle driven using a fuel cell or electricity as a power source and a hybrid vehicle driven using an engine and a battery.

In the electric vehicle or the hybrid vehicle among these environmentally friendly vehicles, a separate heater is not used unlike an air conditioner of a general vehicle, and an air conditioner used in the environmentally friendly vehicle is generally called a heat pump system.

Meanwhile, the electric vehicle having the power source of the fuel cell generates driving force by converting chemical reaction energy between oxygen and hydrogen into electrical energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, cooling means, a heat pump system, and a battery cooling system, respectively, should be configured as separate closed circuits so as to prevent heat generation of the motor, an electric component, and the battery including a fuel cell.

Therefore, a size and a weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since a battery cooling system for heating or cooling the battery according to a state of the vehicle is separately provided to obtain an optimal performance of the battery, a plurality of valves for selectively interconnecting connection pipes are employed, and thus noise and vibration due to frequent opening and closing operations of the valves may be introduced into the vehicle interior, thereby deteriorating the ride comfort.

In addition, when heating the vehicle interior, the heating performance may be deteriorated due to the lack of a heat source, the electricity consumption may be increased due to the usage of the electric heater, and the power consumption of the compressor may be increased.

In addition, a separate heat-exchanger is additionally required in order to recollect waste heat from various heat sources in the heating mode of the vehicle, which results in the disadvantage of increasing manufacturing costs.

The above information disclosed in this background section is only for enhancement of understanding of the background of embodiments of the invention, and therefore it may contain information that does not form the prior art that is already known to a person of ordinary skill in the art.

SUMMARY

The present disclosure relates to a heat pump system for a vehicle. Particular embodiments relate to a heat pump system for a vehicle capable of adjusting a temperature of a battery module by using a single chiller where a refrigerant and a coolant are heat-exchanged, recollecting waste heat of the electrical component and the battery module and using the same for heating of the vehicle, and forming a plurality of coolant flowing lines by a single valve according to a selected mode of the vehicle.

Embodiments of the present disclosure provide a heat pump system for a vehicle capable of enhancing the overall efficiency of the system by adjusting a temperature of a battery module by using a single chiller where a refrigerant and a coolant are heat-exchanged and by selectively recollecting waste heat of the electrical component and the battery module and using the same for heating of the vehicle interior.

In addition, embodiments of the present disclosure provide a heat pump system for a vehicle capable of simplifying a layout of the system and reducing manufacturing costs by forming a plurality of coolant flowing lines by a single valve according to a selected mode of the vehicle.

A heat pump system of a vehicle includes a valve configured to control flowing movement of a coolant that may be interiorly introduced, according to at least one mode for temperature adjustment of a vehicle interior and temperature adjustment of a battery module, a first cooling apparatus that may include a first line of which a first end and a second end may be connected to the valve to selectively circulate the coolant and a radiator and an electrical component provided on the first line, a second cooling apparatus that may include a second line of which a first end and a second end may be connected to the valve to selectively circulate the coolant and the battery module provided on the second line, a first connection line of which a first end may be connected to the valve to selectively circulate the coolant and on which is a chiller, a second connection line of which a first end may be connected to the second line and a second end may be connected to the first connection line, and a third connection line of which a first end may be connected to a second end of the first connection line and a second end may be connected to the first line between the radiator and the electrical component, where the valve may be configured to operate such that one line among the first line, the second line, and the first connection line may be connected to another line or the same line depending on a selected mode among the at least one mode.

A first water pump may be provided in the first line between the valve and the electrical component, and a second water pump may be provided in the second line between the valve and the battery module.

The at least one mode may include a first mode for cooling the electrical component by using a coolant cooled at the radiator and for increasing a temperature of the battery module, a second mode for cooling the electrical component and the battery module by using the coolant cooled at the radiator, a third mode for heating the vehicle interior and for increasing the temperature of the battery module while recollecting waste heat of the electrical component, and a fourth mode for heating the vehicle interior and for recollecting waste heat of the electrical component and the battery module.

In the first mode, a first end of the first line may be connected to a second end of the first line by an operation of the valve such that the first line forms an independent closed circuit in order to supply the coolant cooled at the radiator to the electrical component, a first end of the second line may be connected to a second end of the second line by the operation of the valve such that the second line forms an independent closed circuit, the first connection line may be closed by the operation of the valve, the second connection line may be closed by the closed first connection line, and the coolant stops flowing through the third connection line.

In the second mode, such that the first line and the second line may be interconnected to supply the coolant cooled at the radiator to the electrical component and the battery module, a second end of the first line may be connected to a first end of the second line by an operation of the valve, a portion of the second line that connects the valve and a downstream side of the battery module, with reference to a flow direction of the coolant, may be closed, a first end of the first connection line may be connected to a first end of the first line by the operation of the valve, and the second connection line may be opened such that the second line may be connected to the first connection line.

The coolant may selectively flow through the third connection line.

In the third mode, a portion of the first line connecting the radiator and a downstream side of the electrical component, with reference to a flow direction of the coolant, and connecting the radiator and the valve may be closed by an operation of the valve, a first end of the first connection line may be connected to a first end of the first line by the operation of the valve, the first line may be connected to the first connection line by the third connection line, at the downstream side of the electrical component, a first end of the second line may be connected to a second end of the second line by the operation of the valve such that the second line forms an independent closed circuit, the second connection line may be closed, and the chiller recollects the waste heat of the electrical component from the coolant heated while cooling the electrical component.

In the fourth mode, with reference to a flow direction of the coolant, a portion of the first line connecting the radiator and a downstream side of the electrical component and connecting the radiator and the valve may be closed by an operation of the valve, a second end of the second line may be connected to the opened portion of the first line by the operation of the valve, a first end of the first connection line may be connected to a first end of the second line by the operation of the valve, the second connection line may be opened to connect the second line and the first connection line, the first line may be connected to the first connection line by the third connection line, at the downstream side of the electrical component, the coolant having passed through the electrical component flows into the first connection line along the third connection line connected to the first line, a partial coolant of the coolant having passed through the battery module along the second line flows into the valve along the second line, remaining coolant of the coolant having passed through the battery module along the second line flows into the first connection line along the opened second connection line, and the chiller recollects the waste heat of the electrical component and the battery module from the coolant heated while cooling the electrical component and the battery module, respectively.

The third connection line may always maintain an opened state in the at least one mode, and the coolant may selectively flow depending on a connection structure of the first line, the second line, or the first connection line.

The chiller may be connected to an air conditioner unit through a refrigerant connection line.

The chiller may be a water-cooled heat-exchanger that heat-exchanges the interiorly introduced coolant with a refrigerant supplied from the air conditioner unit.

A coolant heater may be provided in the second line.

For increasing a temperature of the battery module, the coolant heater may be operated such that the coolant supplied to the battery module along the second line may be heated.

The valve may be a 5-way valve.

According to a heat pump system for a vehicle according to an embodiment, the overall efficiency of the system may be enhanced by adjusting a temperature of a battery module by using a single chiller where a refrigerant and a coolant are heat-exchanged and by selectively recollecting waste heat of the electrical component and the battery module and using the same for heating of the vehicle.

In addition, according to embodiments of the present disclosure, streamlining and simplification of the system may be achieved while reducing manufacturing costs by forming a plurality of coolant flowing lines by a single valve according to selected mode of the vehicle.

In addition, according to embodiments of the present disclosure, as cooling of the electrical components and independent temperature adjustment of a battery module unrelated to the operation of the air conditioner unit are available, and the temperature of the battery module is efficiently adjusted, the optimal performance of the battery module is enabled, and the overall travel distance of the vehicle may be increased through the efficient management of the battery module.

In addition, according to an embodiment, it is possible to reduce the manufacturing cost and weight through simplification of an entire system and to improve space utilization.

The following reference identifiers may be used in connection with the accompanying drawings to describe exemplary embodiments of the present disclosure.

10: valve
20: first cooling apparatus
21: first line
22: radiator
23: cooling fan
24: electrical component
26: first water pump
30: second cooling apparatus
31: second line
32: battery module
34: coolant heater
36: second water pump
40: chiller
51: first connection line
53: second connection line
55: third connection line
100: air conditioner unit
110: refrigerant connection line

DETAILED DESCRIPTION OF ILLUSTRATIVE EMBODIMENTS

Exemplary embodiments of the present invention will hereinafter be described in detail with reference to the accompanying drawings.

Exemplary embodiments disclosed in the present specification and the constructions depicted in the drawings are only the preferred embodiments of the present disclosure and do not cover the entire scope of the present disclosure. Therefore, it will be understood that there may be various equivalents and variations included within the scope of the present disclosure.

In order to clarify embodiments of the present disclosure, parts that are not related to the description will be omitted, and the same elements or equivalents are referred to with the same reference numerals throughout the specification.

Also, the size and thickness of each element are arbitrarily shown in the drawings, but embodiments of the present disclosure are not necessarily limited thereto, and in the drawings, the thickness of layers, films, panels, regions, etc. are exaggerated for clarity.

In addition, unless explicitly described to the contrary, the word "comprise" and variations such as "comprises" or "comprising" will be understood to imply the inclusion of stated elements but not the exclusion of any other elements.

Furthermore, each of terms, such as " . . . unit", " . . . means", " . . . portions", " . . . part", and " . . . member" described in the specification, mean a unit of a comprehensive element that performs at least one function or operation.

Figure 1:
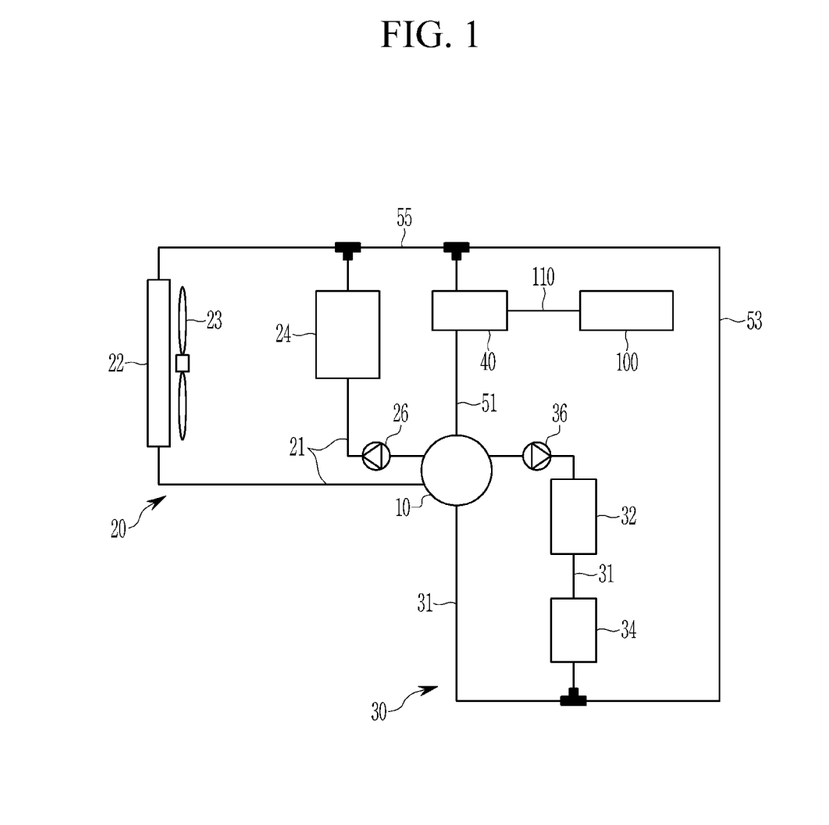
FIG. 1 is a block diagram of a heat pump system for a vehicle according to an embodiment.

FIG. 1 is a block diagram of a heat pump system for a vehicle according to an embodiment.

A heat pump system for a vehicle according to an embodiment may efficiently adjust a temperature of a battery module 32 by using a single chiller 40 where a refrigerant and a coolant are heat-exchanged and may selectively recollect waste heat of an electrical component 24 and the battery module 32 to use the same for heating of the vehicle interior.

In addition, according to the heat pump system, the layout of the system may be simplified and manufacturing costs may be reduced by forming a plurality of coolant flowing lines by a single valve 10 according to a selected mode of the vehicle.

For such a purpose, according to the heat pump system, the electrical component 24 and the battery module 32 through which the coolant circulates may be interconnected with each other through an air conditioner unit 100 and the chiller 40 for circulating the refrigerant for cooling and heating of the vehicle interior.

That is, referring to FIG. 1, the heat pump system may include the valve 10, a first cooling apparatus 20, a second cooling apparatus 30, a first connection line 51, a second connection line 53, and a third connection line 55.

First, the valve 10 may control flow of the coolant that is interiorly introduced, according to at least one selected mode for temperature adjustment of the vehicle interior and temperature adjustment of the electrical component 24 and the battery module 32.

In the present embodiment, the first cooling apparatus 20 may include a first line 21 of which a first end and a second end are connected to the valve 10 to selectively circulate the coolant, and a radiator 22 and the electrical component 24 are provided on the first line 21.

Here, the radiator 22 may be disposed in the front of the vehicle, and a cooling fan 23 may be provided at a downstream side of the radiator 22. Accordingly, the radiator 22 cools the coolant through an operation of the cooling fan 23 and heat-exchange with an ambient air.

In addition, a first water pump 26 may be provided in the first line 21 between the valve 10 and the electrical component 24.

The second cooling apparatus 30 may include a second line 31 of which a first end and a second end are connected to the valve 10 to selectively circulate the coolant, and the battery module 32 is provided on the second line 31.

Here, a second water pump 36 may be provided in the second line 31 between the valve 10 and the battery module 32.

The first water pump 26 and the second water pump 36 may be an electric water pump.

Meanwhile, in the present embodiment, a coolant heater 34 may be provided in the second line 31.

In more detail, the coolant heater 34 may be positioned in the second line 31 at a downstream side of the battery module 32, with reference to a flow direction of the coolant.

For increasing a temperature of the battery module 32, the coolant heater 34 may be operated to heat the coolant supplied to the battery module 32 along the second line 31.

The coolant heater 34 may be an electrical heater operated by supply of power.

That is, the coolant heater 34 may be operated when a temperature of the coolant supplied to the battery module 32 is lower than a target temperature to heat the coolant flowing through the second line 31.

Accordingly, the coolant heated while passing through the coolant heater 34 may be supplied to the battery module 32 along the second line 31 by an operation of the valve 10 and may increase the temperature of the battery module 32.

Therefore, the coolant heater 34 may be selectively operated to increase the temperature of the battery module 32.

In the present embodiment, a first end of the first connection line 51 may be connected to the valve 10 to selectively circulate the coolant. The chiller 40 may be provided in the first connection line 51.

Here, the chiller 40 may be connected to the air conditioner unit 100 through a refrigerant connection line 110 such that the refrigerant is supplied from the air conditioner unit 100.

The chiller 40 may be a water-cooled heat-exchanger that heat-exchanges the interiorly introduced coolant with respect to the refrigerant supplied from the air conditioner unit 100.

Here, the chiller 40 may adjust the temperature of the coolant by heat-exchanging the selectively supplied coolant with the refrigerant selectively supplied from the air conditioner unit 100.

The chiller 40 may be operated when cooling the battery module 32 by using the coolant heat-exchanged with the refrigerant supplied from the air conditioner unit 100 or when recollecting heat from the coolant heated by the waste heat of the electrical component 24 and the battery module 32, respectively, for heating of the vehicle interior.

In the present embodiment, a first end of the second connection line 53 may be connected to the second line 31.

Here, the first end of the second connection line 53 is connected to the second line 31 at the downstream side of the battery module 32 with reference to the flow direction of the coolant flowing along the second line 31.

A second end of the second connection line 53 may be connected to a second end of the first connection line 51.

In addition, a first end of the third connection line 55 may be connected to the second end of the first connection line 51. A second end of the third connection line 55 may be connected to the first line 21 between the radiator 22 and the electrical component 24.

Here, the third connection line 55 may always maintain an opened state in the at least one mode.

The third connection line 55 may selective flow the coolant depending on the connection structure of the first line 21, the second line 31, and the first connection line 51 according to the operation of the valve 10.

The valve 10 in such a heat pump system may operate such that one line among the first line 21, the second line 31, and the first connection line 51 is connected to another line or the same line, depending on a selected mode among the at least one mode.

The valve 10 may be a 5-way valve provided with five ports through which the coolant is drawn and discharged.

Here, the at least one mode may include first, second, third, and fourth modes.

First, in the first mode, the electrical component 24 may be cooled by using the coolant cooled at the radiator 22, and the temperature of the battery module 32 may be increased.

In the second mode, the electrical component 24 and the battery module 32 may be cooled by using the coolant cooled at the radiator 22.

In the third mode, the vehicle interior may be heated, and while recollecting the waste heat of the electrical component 24, the temperature of the battery module 32 may be increased.

In addition, in the fourth mode, the vehicle interior may be heated, and the waste heat of the electrical component 24 and the battery module 32 may be recollected.

Hereinafter, operation and action in each mode of a heat pump system for a vehicle according to embodiments configured as described above is described in detail with reference to FIG. 2 to FIG. 5.

First, an operation in the first mode of a heat pump system for a vehicle according to an embodiment for cooling the electrical component 24 by using the coolant cooled at the radiator 22 and for increasing the temperature of the battery module 32 is described with reference to FIG. 2.

Figure 2:
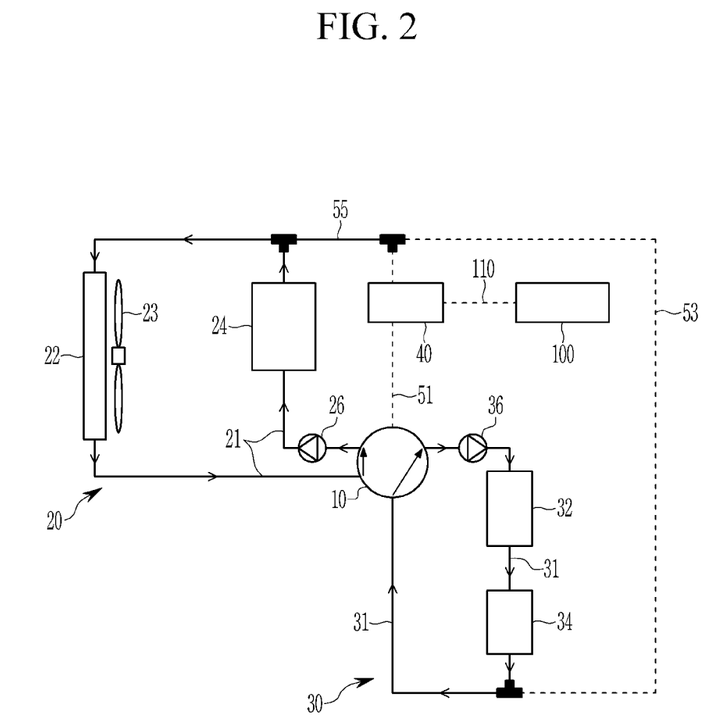
FIG. 2 is an operation diagram of a first mode of a heat pump system of a vehicle according to an embodiment.

FIG. 2 is an operation diagram of the first mode of a heat pump system of a vehicle according to an embodiment.

Referring to FIG. 2, in the first mode, the valve 10 may operate such that the first line 21 forms an independent closed circuit in order to supply the coolant cooled at the radiator 22 to the electrical component 24.

Then, a first end of the first line 21 may be connected to a second end of the first line 21 by the operation of the valve 10.

Simultaneously, a first end of the second line 31 may be connected to a second end of the second line 31 by the operation of the valve 10, such that the second line 31 forms an independent closed circuit.

Here, the first connection line 51 may be closed by the operation of the valve 10.

In addition, the second connection line 53 may be closed by the closed first connection line 51.

In addition, the third connection line 55 may maintain the opened state. However, as the first connection line 51 is closed, the coolant may stop flowing through the third connection line 55.

Accordingly, the first line 21 and the second line 31 may form an independent closed circuit for circulation of the coolant, respectively.

Meanwhile, the air conditioner unit 100 may stop operating.

In such a state, when the first water pump 26 is operated, the coolant cooled at the radiator 22 is drawn into the valve 10 along the first line 21 and then discharged through the first line 21.

That is, the coolant discharged to the first line 21 may efficiently cool the electrical component 24 while passing through the electrical component 24. In addition, the coolant having cooled the electrical component 24 flows back into the radiator 22 along the first line 21. The coolant introduced into the radiator 22 may be cooled through heat-exchange with the ambient air.

Meanwhile, the second water pump 36 may be operated to circulate the coolant through the second line 31.

When the second water pump 36 is operated, the coolant may circulate along the second line 31.

That is, the coolant discharged from the valve 10 to the second line 31 sequentially passes through the battery module 32 and the coolant heater 34 and then flows back into the valve 10 to circulate along the valve 10 and the second line 31.

Here, the coolant heater 34 may efficiently increase the temperature of the battery module 32 by heating the coolant circulating along the second line 31.

That is, by repeatedly performing the above-described processes, the coolant cooled at the radiator 22 may be cooled to prevent the electrical component 24 from overheating.

In addition, in the first mode, the temperature of the battery module 32 may be efficiently adjusted by operating the coolant heater 34 provided on the second line 31.

In the present embodiment, an operation in the second mode for cooling the electrical component 24 and the battery module 32 by using the coolant cooled at the radiator 22 is described with reference to FIG. 3.

Figure 3:
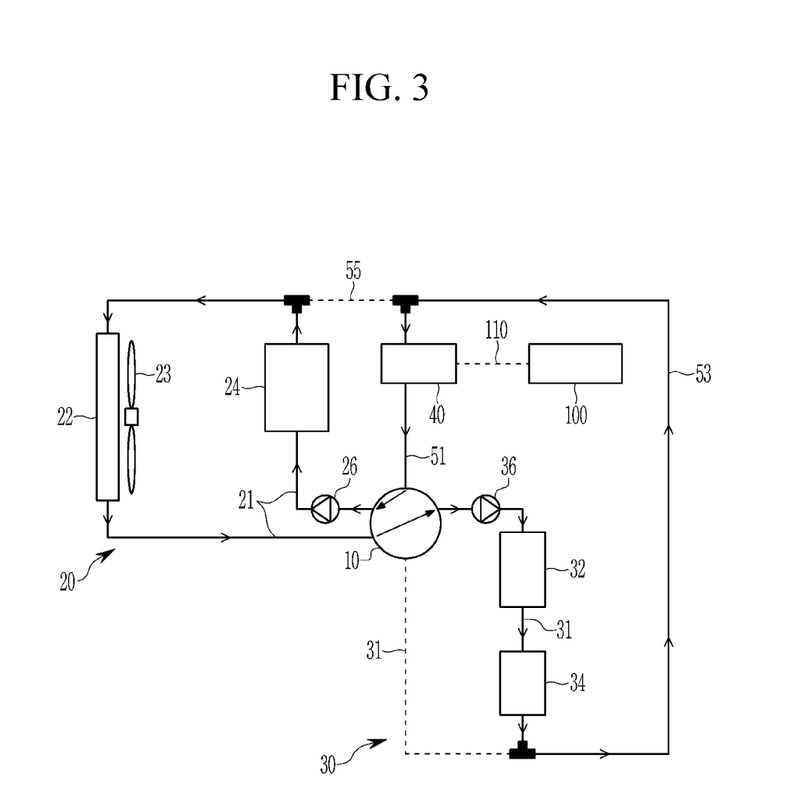
FIG. 3 is an operation diagram of a second mode of a heat pump system of a vehicle according to an embodiment.

FIG. 3 is an operation diagram of the second mode of a heat pump system of a vehicle according to an embodiment.

Referring to FIG. 3, in the second mode, the valve 10 is operated such that the first line 21 and the second line 31 are interconnected to supply the coolant cooled at the radiator 22 to the electrical component 24 and the battery module 32.

Then, the second end of the first line 21 may be connected to the first end of the second line 31 by the operation of the valve 10.

Simultaneously, with reference to the flow direction of the coolant, a portion of the second line 31 that connects the valve 10 and the downstream side of the battery module 32 may be closed by the operation of the valve 10.

In addition, the first end of the first connection line 51 may be connected to the first end of the first line 21 by the operation of the valve 10.

In addition, the second connection line 53 may be opened such that the opened portion of the second line 31 is connected to the first connection line 51.

Here, the air conditioner unit 100 may close the refrigerant connection line 110 such that the refrigerant is not supplied to the chiller 40.

In such a state, when the first and second water pumps 26 and 36 are operated, the coolant cooled at the radiator 22 is drawn into the valve 10 along the first line 21 and then discharged to the second line 31.

The coolant discharged to the second line 31 passes through the battery module 32 and then flows along the second connection line 53 connected to the opened second line 31.

The coolant flowing through the second connection line 53 flows into the valve 10 via the first connection line 51. Then, the coolant introduced through the valve 10 is discharged to the first line 21 connected to the first connection line 51.

That is, by repeatedly performing such operations, the coolant cooled at the radiator 22 may circulate sequentially through the first line 21, the second line 31, the second connection line 53, the first connection line 51, and the first line 21.

Here, the coolant cooled at the radiator 22 may pass through the electrical component 24 along the first line 21 after first passing through the battery module 32 along the second line 31.

Accordingly, the coolant cooled at the radiator 22 may first pass through the battery module 32, thereby enabling more efficient cooling.

Meanwhile, the coolant may selectively flow through the third connection line 55 when the first water pump 26 and the second water pump 36 are operated at different rotation speeds.

That is, the first water pump 26 and the second water pump 36 may be operated at different rotation speeds depending on heat generation amounts of the electrical component 24 and the battery module 32.

For example, when a heat generation amount of the electrical component 24 is larger than a heat generation amount of the battery module 32, the first water pump 26 may be operated at a rotation speed higher than that of the second water pump 36 such that the coolant having a flow amount larger than the flow amount of the coolant supplied to the battery module 32 is supplied to the electrical component 24.

Then, the third connection line 55 may flow a portion of the coolant having passed through the electrical component 24 along the first line 21 to the first connection line 51.

Accordingly, an entire flow amount of the coolant circulating the first line 21 is increased compared to a flow amount of the coolant circulating the second line 31 prior to passing through the battery module 32, and accordingly, the electrical component 24 having a relatively large heat generation amount may be cooled more efficiently.

To the contrary, when the heat generation amount of the battery module 32 is larger than the heat generation amount of the electrical component 24, the second water pump 36 may be operated at a rotation speed higher than that of the first water pump 26 such that the coolant having a flow amount larger than the flow amount of the coolant supplied to the electrical component 24 is supplied to the battery module 32.

Then, the third connection line 55 may flow a portion of the coolant flowing through the second connection line 53 to the first line 21 at a downstream side of the electrical component 24, so as to directly flow into the radiator 22.

Accordingly, an additional coolant drawn into the first line 21 through the third connection line 55 may increase the flow amount of the entire coolant flowing from the radiator 22 into the second line 31 via the first line 21 and the valve 10.

Then, the entire flow amount of the coolant circulating the second line 31 is increased compared to the flow amount of the coolant circulating the first line 21 prior to passing through the electrical component 24, and accordingly, the battery module 32 having a relatively large heat generation amount may be cooled more efficiently.

That is, depending on heat generation amounts of the electrical component 24 and the battery module 32, the third connection line 55 may increase or decrease the flow amount of the coolant circulating in the first line 21 or the second line 31 within a limited flow amount of the coolant circulating along the first line 21, the second line 31, the first connection line 51, and the second connection line 53 that are interconnected, and thereby efficiency of the entire system may be enhanced.

In the present embodiment, an operation in the third mode for heating the vehicle interior and for increasing the temperature of the battery module 32 while recollecting the waste heat of the electrical component 24 is described with reference to FIG. 4.

Figure 4:
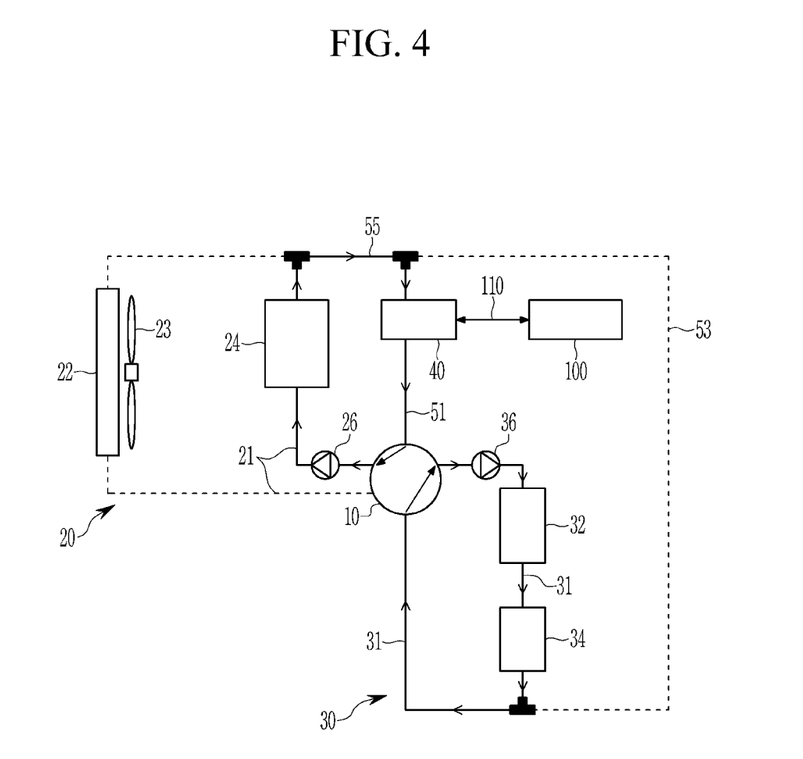
FIG. 4 is an operation diagram of a third mode of a heat pump system of a vehicle according to an embodiment.

FIG. 4 is an operation diagram of the third mode of a heat pump system of a vehicle according to an embodiment.

With reference to the flow direction of the coolant, a portion of the first line 21 connecting the radiator 22 and the downstream side of the electrical component 24 and connecting the radiator 22 and the valve 10 may be closed by the operation of the valve 10.

Simultaneously, the first end of the first connection line 51 may be connected to the first end of the first line 21 that is opened by the operation of the valve 10.

In addition, the first line 21 may be connected to the opened first connection line 51 by the third connection line 55 at the downstream side of the electrical component 24.

Simultaneously, the first end of the second line 31 may be connected to the second end of the second line 31 by the operation of the valve 10 such that the second line 31 forms an independent closed circuit.

Here, the second connection line 53 may be closed as the second line 31 forms an independent closed circuit.

In such a state, when the first water pump 26 is operated, the coolant discharged from the valve 10 to the first line 21 may cool the electrical component 24 while passing through the electrical component 24.

The coolant having cooled the electrical component 24 may flow into the first connection line 51 along the opened third connection line 55.

The coolant flowing into the first connection line 51 may pass through the chiller 40 and then flow into the valve 10.

Then, the coolant drawn into the valve 10 along the first connection line 51 may be again discharged to the first line 21 connected to the electrical component 24.

Here, the air conditioner unit 100 may be operated in order to heat the vehicle interior.

That is, the air conditioner unit 100 may operate such that the refrigerant may be supplied to the chiller 40 through the refrigerant connection line 110.

Accordingly, the chiller 40 may recollect the waste heat of the electrical component 24 from the coolant heated while cooling the electrical component 24.

In more detail, the coolant with the increased temperature by absorbing the waste heat of the electrical component 24 passes through the chiller 40 along the first connection line 51 and is recollected while heating the refrigerant supplied to the chiller 40.

Through such an operation, the chiller 40 may heat the refrigerant by heat-exchanging the coolant and the refrigerant in order to recollect waste heat from the coolant heated while passing through the electrical component 24. The heated refrigerant may be supplied back to the air conditioner unit 100.

As such, by repeatedly performing the above-described processes, the chiller 40 may smoothly recollect the waste heat of the electrical component 24 and use the same for heating of the vehicle interior.

That is, in the third mode, by absorbing the waste heat of the electrical component 24 at the chiller 40 and using it to increase the temperature of the refrigerant, a power consumption of the compressor provided in the air conditioner unit 100 may be decreased, and a heating efficiency thereof may be enhanced.

In addition, an operation in the fourth mode of the heat pump system for heating the vehicle interior and for recollecting the waste heat of the electrical component 24 and the battery module 32 is described with reference to FIG. 5.

Figure 5:
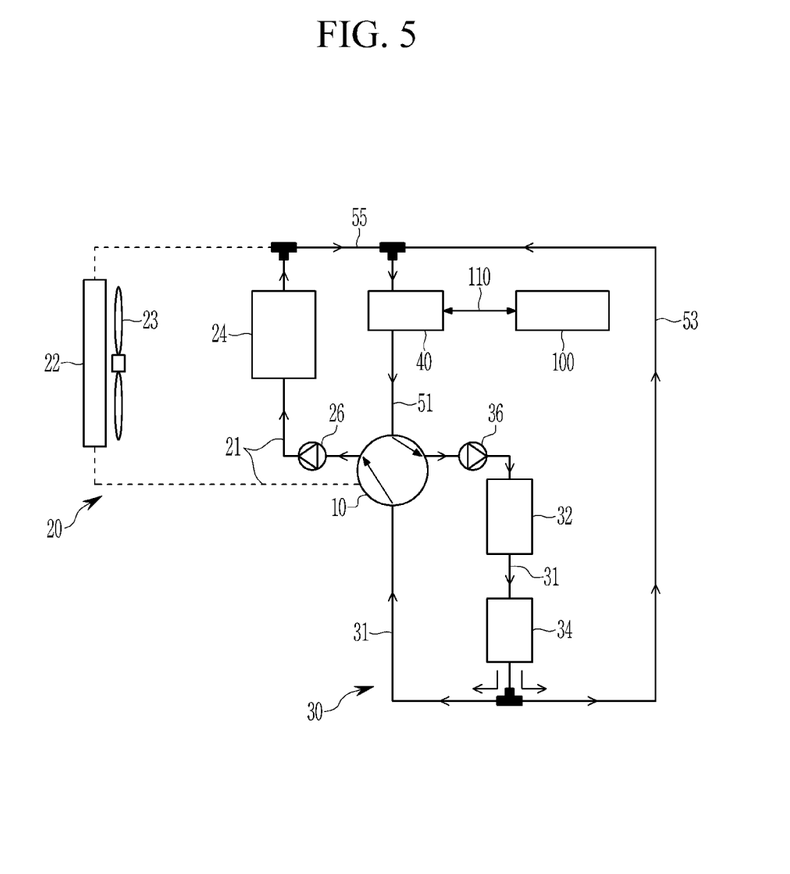
FIG. 5 is an operation diagram of a fourth mode of a heat pump system of a vehicle according to an embodiment.

FIG. 5 is an operation diagram of the fourth mode of a heat pump system of a vehicle according to an embodiment.

Referring to FIG. 5, in the fourth mode, with reference to the flow direction of the coolant, the portion of the first line 21 connecting the radiator 22 and the downstream side of the electrical component 24 and connecting the radiator 22 and the valve 10 may be closed by the operation of the valve.

The second end of the second line 31 may be connected to the portion of the first line 21 that is opened by the operation of the valve 10.

In addition, the first end of the first connection line 51 may be connected to the first end of the second line 31 by the operation of the valve 10.

The second connection line 53 may be opened to connect the second line 31 and the first connection line 51.

In addition, the first line 21 may be connected to the opened first connection line 51 by the third connection line 55 at the downstream side of the electrical component 24.

In such a state, when the first and second water pumps 26 and 36 are operated, the coolant having passed through the electrical component 24 may flow into the first connection line 51 along the third connection line 55 connected to the first line 21.

Here, the coolant discharged from the valve 10 to the first line 21 may cool the electrical component 24 while passing through the electrical component 24.

That is, the coolant having cooled the electrical component 24 may flow into the first connection line 51 along the opened third connection line 55.

Simultaneously, the coolant discharged from the valve 10 to the second line 31 may cool the battery module 32 while passing through the battery module 32 along the second line 31.

Then, a portion of the coolant having passed through the battery module 32 may flow into the valve 10 along the second line 31.

The coolant drawn into the valve 10 along the second line 31 may be discharged to the first line 21 to pass through the electrical component 24.

Meanwhile, the remaining portion of the coolant having passed through the battery module 32 along the second line 31 may flow into the first connection line 51 along the opened second connection line 53.

That is, the coolant heated while cooling the electrical component 24 and the battery module 32, respectively, may flow into the first connection line 51.

Each coolant flowing into the first connection line 51 may pass through the chiller 40 and then flow into the valve 10.

Then, the coolant drawn into the valve 10 along the first connection line 51 may be again discharged to the second line 31 connected to the battery module 32, and the above-described operation may be repetitively performed.

Here, the air conditioner unit 100 may be operated in order to heat the vehicle interior.

That is, the air conditioner unit 100 may operate such that the refrigerant may be supplied to the chiller 40 through the refrigerant connection line 110.

Accordingly, the chiller 40 may recollect the waste heat of the electrical component 24 and the battery module 32 from the coolant heated while cooling the electrical component 24 and the battery module 32, respectively.

In more detail, the coolant heated by absorbing the waste heat of both the electrical component 24 and the battery module 32 increases the temperature of the refrigerant supplied to the chiller 40 while passing through the chiller 40 along the first connection line 51.

Through such an operation, the chiller 40 may heat the refrigerant by heat-exchanging the coolant and the refrigerant in order to recollect waste heat from the coolant heated while passing through the electrical component 24 and the battery module 32. The heated refrigerant may be supplied back to the air conditioner unit 100.

As such, by repeatedly performing the above-described processes, the chiller 40 may smoothly recollect the waste heat of the electrical component 24 and the battery module 32 and use the same for heating of the vehicle interior.

That is, in the fourth mode, by absorbing the waste heat of the electrical component 24 and the waste heat of the battery module 32 at the chiller 40 and using it to heat the refrigerant, a power consumption of the compressor provided in the air conditioner unit 100 may be decreased, and a heating efficiency thereof may be enhanced.

According to a heat pump system for a vehicle according to an embodiment, by adjusting a temperature of the battery module 32 by using a single chiller 40 where a refrigerant and the coolant are heat-exchanged and selectively recollecting the waste heat of the electrical component 24 and the battery module 32 and using the same for heating of the vehicle, the overall efficiency of the system may be enhanced.

In addition, according to embodiments of the present disclosure, by forming the plurality of coolant flowing lines by a single valve 10 according to the selected mode of the vehicle, streamlining and simplification of the system may be achieved while reducing manufacturing costs.

In addition, according to embodiments of the present disclosure, independent temperature adjustment of the battery module 32 may be achieved regardless of cooling of the electrical component 24 and an operation of the air conditioner unit 100, optimal performance of the battery module 32 may be obtained by efficiently adjusting the temperature of the battery module 32, and the overall travel distance of vehicle may be increased through efficient management of the battery module 32.

In addition, according to an embodiment, it is possible to reduce the manufacturing cost and weight through simplification of an entire system and to improve space utilization.

While embodiments of this invention have been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A heat pump system of a vehicle, the system comprising:
   a valve configured to control a flow of a coolant that is interiorly introduced according to a mode selected from a plurality of modes for temperature adjustment of a vehicle interior and temperature adjustment of a battery module;
   a first cooling apparatus comprising at least one first line comprising a first end and a second end directly connected to the valve to allow circulation of the coolant;
   a radiator on the first line;
   an electrical component on the first line;
   a second cooling apparatus comprising at least one second line comprising a first end and a second end directly connected to the valve to allow circulation of the coolant, wherein the battery module is on the second line;
   a first connection line comprising a first end connected to the valve to allow circulation of the coolant;
   a chiller on the first connection line;
   a second connection line comprising a first end connected to the second line and a second end connected to the first connection line; and
   a third connection line comprising a first end connected to a second end of the first connection line and a second end connected to the first line between the radiator and the electrical component; and
   wherein the valve is configured to operate such that the first line, the second line, or the first connection line is connected to another line or to itself depending on the selected mode.

2. The system of claim 1, further comprising:
   a first water pump on the first line between the valve and the electrical component; and
   a second water pump on the second line between the valve and the battery module.

3. The system of claim 1, wherein:
   the third connection line maintains an opened state in the selected mode; and
   the coolant is configured to selectively flow depending on a connection structure of the first line, the second line, or the first connection line.

4. A heat pump system of a vehicle, the system comprising:
   a valve configured to control a flow of a coolant that is interiorly introduced according to a mode selected from a plurality of modes for temperature adjustment of a vehicle interior and temperature adjustment of a battery module;
   a first cooling apparatus comprising at least one first line comprising a first end and a second end directly connected to the valve to allow circulation of the coolant;
   a radiator on the first line;
   an electrical component on the first line;
   a second cooling apparatus comprising at least one second line comprising a first end and a second end directly connected to the valve to allow circulation of the coolant, wherein the battery module is on the second line;
   a first connection line comprising a first end connected to the valve to allow circulation of the coolant;
   an air conditioner unit;
   a refrigerant connection line;
   a chiller on the first connection line, wherein the chiller is connected to the air conditioner unit through the refrigerant connection line;
   a second connection line comprising a first end connected to the second line and a second end connected to the first connection line; and
   a third connection line comprising a first end connected to a second end of the first connection line and a second end connected to the first line between the radiator and the electrical component; and
   wherein the valve is configured to operate such that the first line, the second line, or the first connection line is connected to another line or to itself depending on the selected mode.

5. The system of claim 4, wherein the chiller comprises a water-cooled heat-exchanger configured to heat-exchange the coolant with a refrigerant supplied from the air conditioner unit.

6. The system of claim 1, further comprising a coolant heater on the second line.

7. The system of claim 6, wherein, in order to increase a temperature of the battery module, the coolant heater is configured to be operated such that the coolant supplied to the battery module along the second line is heated.

8. The system of claim 1, wherein the valve comprises a 5-way valve.

9. A heat pump system of a vehicle, the system comprising:
   a valve configured to control a flow of a coolant that is interiorly introduced according to a mode selected from a plurality of modes for temperature adjustment of a vehicle interior and temperature adjustment of a battery module, the plurality of modes comprising:
      a first mode for cooling an electrical component by using the coolant cooled at a radiator and for increasing a temperature of the battery module;
      a second mode for cooling the electrical component and the battery module by using the coolant cooled at the radiator;
      a third mode for heating the vehicle interior and for increasing the temperature of the battery module while recollecting waste heat of the electrical component; and
      a fourth mode for heating the vehicle interior and for recollecting the waste heat of the electrical component and the battery module;
   a first cooling apparatus comprising at least one first line comprising a first end and a second end directly connected to the valve to allow circulation of the coolant, wherein the radiator and the electrical component are on the at least one first line;

a second cooling apparatus comprising at least one second line comprising a first end and a second end directly connected to the valve to allow circulation of the coolant, wherein the battery module is on the at least one second line;

a first connection line comprising a first end connected to the valve to allow circulation of the coolant;

a chiller on the first connection line;

a second connection line comprising a first end connected to the second line and a second end connected to the first connection line; and a third connection line comprising a first end connected to a second end of the first connection line and a second end connected to the first line between the radiator and the electrical component; and wherein the valve is configured to operate such that the first line, the second line, or the first connection line is connected to another line or to itself depending on the selected mode.

10. The system of claim 9, wherein, in the first mode:
the first end of the at least one first line is connected to the second end of the at least one first line by an operation of the valve such that the at least one first line defines an independent closed circuit in order to supply the coolant cooled at the radiator to the electrical component;
the first end of the at least one second line is connected to the second end of the at least one second line by the operation of the valve such that the second line defines an independent closed circuit;
the first connection line is closed by the operation of the valve;
the second connection line is closed by the closed first connection line; and
the coolant does not flow through the third connection line.

11. The system of claim 9, wherein, in the second mode:
the second end of the at least one first line is connected to the first end of the at least one second line by an operation of the valve;
a portion of the at least one second line connecting the valve and a downstream side of the battery module, with reference to a flow direction of the coolant, is closed;
the first end of the first connection line is connected to a first end of the at least one first line by the operation of the valve; and
the second connection line is opened such that the at least one second line is connected to the first connection line.

12. The system of claim 11, wherein the third connection line is configured to allow flow of the coolant therethrough.

13. The system of claim 9, wherein, in the third mode:
a portion of the at least one first line connecting the radiator and a downstream side of the electrical component, with reference to a flow direction of the coolant, and connecting the radiator and the valve is closed by an operation of the valve;
the first end of the first connection line is connected to the first end of the at least one first line by the operation of the valve;

the at least one first line is connected to the first connection line by the third connection line at the downstream side of the electrical component;
the first end of the at least one second line is connected to the second end of the at least one second line by the operation of the valve such that the at least one second line defines an independent closed circuit;
the second connection line is closed; and
the chiller is configured to recollect the waste heat of the electrical component from the coolant heated while cooling the electrical component.

14. The system of claim 9, wherein, in the fourth mode:
with reference to a flow direction of the coolant, a portion of the at least one first line connecting the radiator and a downstream side of the electrical component and connecting the radiator and the valve is closed by an operation of the valve;
the second end of the at least one second line is connected to an opened portion of the at least one first line by the operation of the valve;
the first end of the first connection line is connected to the first end of the at least one second line by the operation of the valve;
the second connection line is opened to connect the at least one second line and the first connection line;
the at least one first line is connected to the first connection line by the third connection line at the downstream side of the electrical component;
the coolant having passed through the electrical component flows into the first connection line along the third connection line connected to the at least one first line;
a portion of the coolant having passed through the battery module along the at least one second line flows into the valve along the at least one second line;
a remaining portion of the coolant having passed through the battery module along the at least one second line flows into the first connection line along the opened second connection line; and
the chiller is configured to recollect the waste heat of the electrical component and the battery module from the coolant heated while cooling the electrical component and the battery module, respectively.

15. The system of claim 9, further comprising:
a first water pump on the at least one first line between the valve and the electrical component; and
a second water pump on the at least one second line between the valve and the battery module.

16. The system of claim 9, wherein the chiller is connected to an air conditioner unit through a refrigerant connection line.

17. The system of claim 16, wherein the chiller comprises a water-cooled heat-exchanger configured to heat-exchange the coolant with a refrigerant supplied from the air conditioner unit.

18. The system of claim 9, further comprising a coolant heater on the at least one second line.

19. The system of claim 18, wherein, in order to increase a temperature of the battery module, the coolant heater is configured to be operated such that the coolant supplied to the battery module along the at least one second line is heated.

20. The system of claim 9, wherein the valve comprises a 5-way valve.

* * * * *

UNITED STATES PATENT AND TRADEMARK OFFICE
CERTIFICATE OF CORRECTION

PATENT NO. : 12,496,874 B2  
APPLICATION NO. : 18/330619  
DATED : December 16, 2025  
INVENTOR(S) : Yong Woong Cha et al.

Page 1 of 1

It is certified that error appears in the above-identified patent and that said Letters Patent is hereby corrected as shown below:

In the Claims

In Column 15, Line 48, Claim 11:  
Change "the first connection line is connected to a"  
To --the first connection line is connected to the--

Signed and Sealed this  
Third Day of February, 2026

John A. Squires  
*Director of the United States Patent and Trademark Office*